United States Patent [19]
Carlson et al.

[11] Patent Number: 4,642,934
[45] Date of Patent: Feb. 17, 1987

[54] TRANSPORTABLE LIVE WELL LINER

[76] Inventors: Joseph D. Carlson, 52705 Winding Waters La.; Bruce D. Goode, 23552 Thistle Ct., both of Elkhart, Ind. 46514

[21] Appl. No.: 722,469

[22] Filed: Apr. 12, 1985

[51] Int. Cl.$^4$ ............................................. A01K 97/00
[52] U.S. Cl. ........................................... 43/55; 43/56; 220/404; 383/11; 383/12; 383/13
[58] Field of Search ...................... 43/55, 56; 220/404, 220/19; 383/11, 12, 13

[56] References Cited

U.S. PATENT DOCUMENTS

| | | | |
|---|---|---|---|
| 1,561,653 | 6/1925 | Linguist | 43/56 |
| 2,253,688 | 4/1940 | Collins | 43/55 |
| 2,323,318 | 7/1943 | Farkas | 43/55 |
| 3,196,576 | 7/1965 | Thomas | 43/56 |
| 4,483,440 | 11/1984 | Ware | 220/404 |

*Primary Examiner*—Nicholas P. Godici
*Assistant Examiner*—Karen Skillman
*Attorney, Agent, or Firm*—Rodger H. Flagg

[57] ABSTRACT

A transportable liner for use in a live well is disclosed, for transporting the catch, such as fish from the live well. The liner is substantially made of a flexible, porous material forming a plurality of adjoining sides and bottom which form an open topped porous enclosure therebetween. A draw string is disposed along the upper portion of the adjoining sides, in a manner to draw the sides together when the draw string is pulled, to enclose the catch within the liner. Releasable retaining apparatus, such as suction cups, hook and eye fasteners or magnets are used to releasably secure the liner to the live well. Weights, or weighted cord, may be secured to the liner in proximity to the bottom of the liner to resist bouyancy of the liner within the live well, when in the presence of an aqueous fluid.

19 Claims, 10 Drawing Figures

TRANSPORTABLE LIVE WELL LINER

TECHNICAL FIELD OF THE INVENTION

This invention relates to a transportable liner for use with a live well, for fishing, or the like, wherein the liner is releasably secured to the live well, and the liner may be readily withdrawn from the live well, for ease of transporting the catch from the live well.

BACKGROUND OF THE INVENTION

The use of a live well to keep a catch, such as a fish or the like, alive during fishing has been popular for years. Earlier versions provided a porous enclosure which was disposed overboard to allow the passage of water through the porous enclosure to keep the catch alive. The enclosure was secured to a boat by a line, bracket, or other means. U.S. Pat. Nos. 2,323,318; 3,141,257; 3,674,188 and 3,938,276 are representative of this art. Bringing the porous enclosure onboard to add the catch to the enclosure was messy and time consuming; while adding the catch to the enclosure when the enclosure was overboard, entailed the risk of loosing the catch overboard.

To solve these problems, portable live wells were developed to retain a porous liner within a portable aqueous fluid container. U.S. Pat. Nos. 2,597,002; 2,787,081 and 2,866,294 are representative of this advancement in the art.

More recently, live wells are being built into the boat itself, requiring the user to transfer the catch from the live well to a separate container to transport the catch from the boat. Such live wells are often built of fiberglass or plastic which does not easily lend itself to modification by the user. What is needed is a porous liner adapted to be releasably secured to a live well to receive the catch therein, in a manner to enable the user to remove the liner from the live well for ease of transport of the catch from the boat.

SUMMARY OF THE INVENTION

Therefore, one object of this invention is to provide an improved liner for use within a live well, that is easily removable from the live well for transport of the catch from the live well.

Another object is to provide an improved live well liner having a plurality of retaining means secured thereto, wherein the retaining means may be releasably secured to a live well.

Another object is to provide a means to resist bouyancy of the liner within the live well in the presence of an aqueous fluid.

Yet another object is to provide an improved live well liner for use in a live well built into a boat, wherein the liner is releasably secured to the live well, and the liner is removed from the live well for ease of removal and transport of the catch from the live well.

Still another object is to provide a novel liner of porous construction having adjoining sides, and bottom having an open top portion, with means to draw the open top portion closed to enclose the catch within the liner for ease of transport of the catch from the live well.

Yet another object is to provide an improved liner adapted for use with existing live wells of varying dimensions and construction.

Still another object is to provide an improved live well liner embodying any combination of objects herein disclosed.

These and other objects of this invention will be apparent to one of average skill in this art, from the disclosure of the following drawings, specification and claims.

BRIEF DESCRIPTION OF THE DRAWINGS

The above mentioned and other features and objects of this invention and the manner of attaining them will be best understood by reference to the following description of the invention taken in conjunction with the accompanying drawings wherein.

DESCRIPTION OF THE PREFERRED EMBODIMENT

Figure 1:
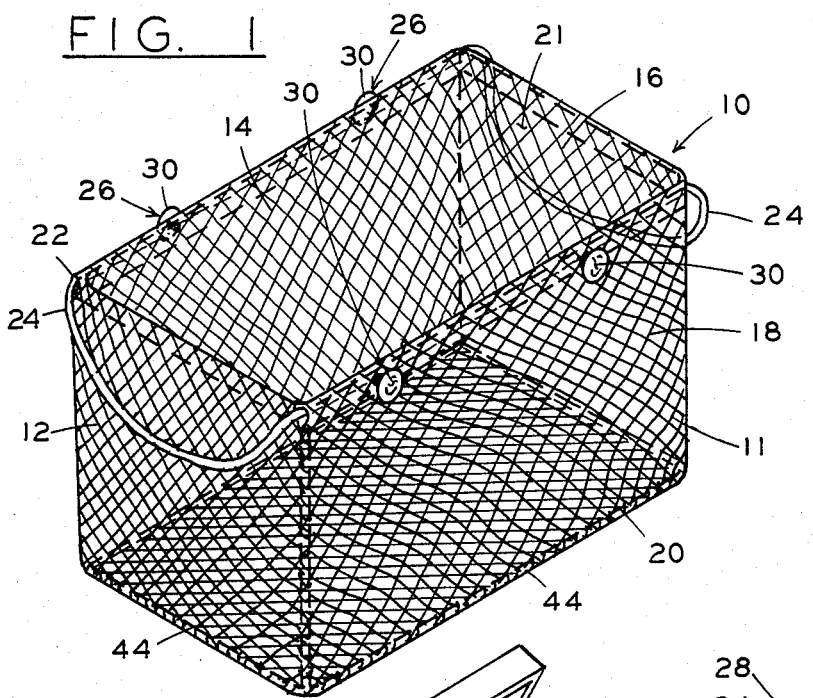
FIG. 1 is a perspective view of the live well liner removed from the live well.
Figure 2:
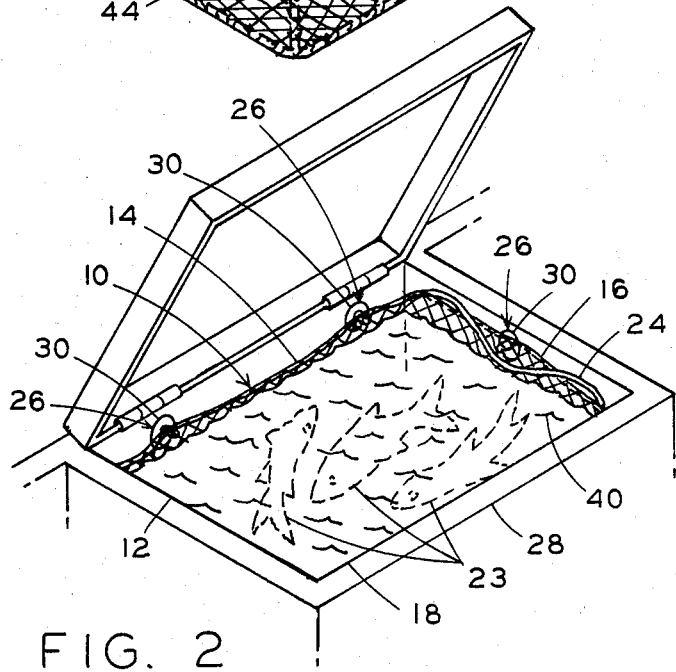
FIG. 2 is a perspective view of the liner releasably secured within the live well in the presence of a aqueous fluid.
Figure 3A:
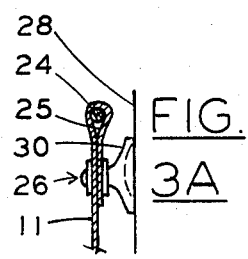
FIG. 3A is a partial view of one embodiment of the releasable retaining means showing a suction cup secured to the liner.
Figure 3C:
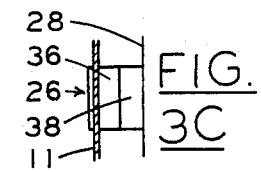
FIG. 3C is a partial view of an alternate embodiment of the releasable retaining means showing a pair of magnets, one of which is secured to the liner and the other secured to the live well.
Figure 3B:
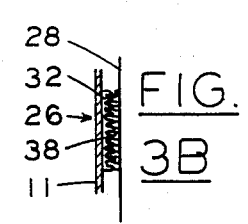
FIG. 3B is a partial view of an alternate embodiment of the releasable retaining means showing a hook and eye fastener means with one of the hook and eye fastener means secured to the liner, and the other secured to the live well.
Figure 6:
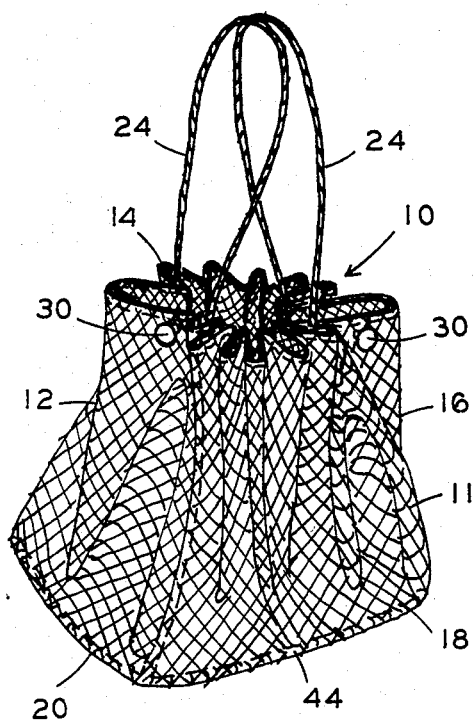
FIG. 6 is a perspective view showing the liner drawn closed for transport.
Figure 5A:
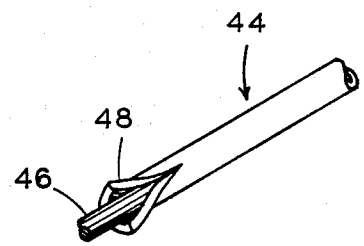
FIG. 5A is an enlarged view of the lead line secured to the bottom portion of the liner, to resist bouyancy of the liner within the live well during presence of an aqueous fluid.
Figure 5B:
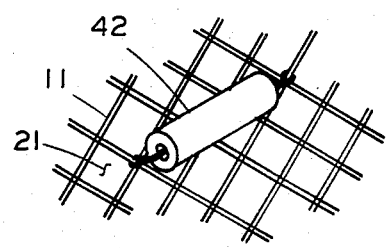
FIG. 5B is a perspective view of a weight secured to the liner.
Figure 4A:
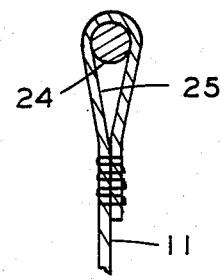
FIG. 4A is a cross sectional view of the preferred draw string retaining means.
Figure 4B:
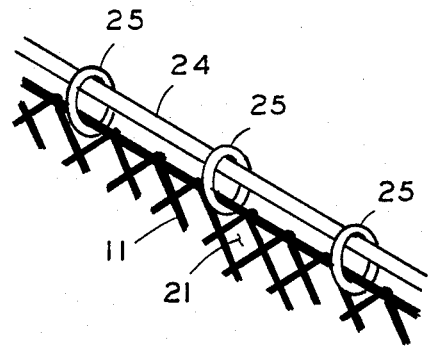
FIG. 4B is a side view of an alternate configuration of the draw string retaining means.

The subject matter which we regard as our invention is particularly pointed out and distinctly claimed in the claims. The structure and operation of our invention together with further objects and advantages may be better understood from the following description given in connection with the accompanying drawings, in which FIG. 1 is a perspective view of liner 10 having a plurality of flexible, porous sides 12, 14, 16, 18 adjoining a flexible, porous bottom portion 20.

The flexible, porous material 11 used to fabricate the liner is preferably a material of woven mesh construction, wherein the openings 21 between the woven material are of a size smaller than the catch 23 to be retained therein. The preferred size of the mesh opening 21 is less than one inch and greater than one-thirty second of an inch in size.

A draw string receiving means 22 is disposed along the upper portion of at least two sides 12, 14, 16, 18. A draw string 24 is slidably disposed within the draw string receiving means 22 in a manner to expose at least a portion of the draw string 24 externally of the liner 10 along at least a portion of two opposed sides 12, 16 or 14, 18.

The draw string receiving means 22 may be any conventional means of slidably receiving the draw string 24 in relation to the liner 10, including, but not limited to, a plurality of loops 25 extending in spaced relation along the upper portion of at least two sides 12, 14, 16 and 18, or the draw string receiving means 22 may be an internal passage 25 formed at the upper portion of the sides by folding and securing at least a portion of the side material to itself.

A plurality of releasable retaining means 26 are disposed about is the upper portion of the liner sides to releasably secure liner 10 to live well 28. One preferred means of securement is by use of suction cups 30 secured in spaced relation to the upper portion of at least two sides of liner 10, with the suction cup portion disposed externally from liner 10, for ease of securement of the suction cup 30 to live well 28 sides.

Another preferred releasable retaining means 26 comprises a hook and eye fastener means 32, 34 wherein one of the hook and eye fastener means 32 is secured to the upper portion of at least two sides of the liner 10 sides, and the other of the hook and eye fastener means 34 is secured to at least two sides of the live well 28 in alignment with the hook and eye fastener means 32 secured to liner 10, for releasable securement therebetween.

Where hook and eye fastener means 32, 34 are used, the hook and eye fastener means 34 is preferably secured to the live 28 well by gluing.

An alternate means of releasably securing the liner to the live well comprises securing one of the hook and eye fastener means 34 to the liner 10 in a manner and location previously disclosed, and securing the other hook and eye fastener means to a suction cup 30. The suction cup 30 may be secured to the live well 28, and the liner removed from the live well by separating the hook and eye fastener means 32, 34, or by separating the suction cup 30 from the live well 28.

Another preferred releasable retaining means 26 comprises a plurality of magnets 36, secured in spaced relation about the upper portion of the liner 10 sides, with a plurality of aligned attracting magnets 38 secured to the sides of the live well 28.

Another preferred releasable retaining means 26 comprises a plurality of magnets 36, secured in spaced relation about the upper portion of the liner 10 sides, with a plurality of aligned attracting magnets 38 secured to the sides of the live well 28. Where the live well 28 is fabricated of a ferris material such as steel, magnets 38 will not be required, as magnets 36 secured to liner 10 will adhere directly to the ferris structure of live well 28. Where live well 28 is made of non-ferris material, such as aluminum, fiberglass or other plastic materials, magnets 38 or ferris material may be fixedly secured to the live well 28 walls, in alignment with the magnets 36 secured to liner 10, to provide a releasable retaining means between magnets 36, 38.

Where the porous material used to fabricate liner 10 is bouyant, a means to resist bouyancy is needed to keep the bottom 20 of liner 10 from floating when an aqueous fluid 40 is disposed within live well 28. One means to resist bouyancy comprises a plurality of weights 42 secured in proximity to bottom portion 20 of liner 10. Weights 42 should be of a weight sufficient to resist bouyancy of the liner 10 within live well 28 when in the presence of an aqueous fluid 40.

Another means of resisting bouyancy comprises securing a weighted cord such as a lead line 44 along at least two sides and adjoining bottom portions. The lead line 44 is preferably made with a flexible lead core 46 surrounded by cloth, rubber, plastic or the like 48.

The means to resist bouyancy may also be accomplished by selecting a non-bouyant liner 10 material of a rigidity sufficient to resist bouyancy of liner 10 within live well 28, in the presence of an aqueous fluid 40. The material is preferably joined by sewing sides and bottom portions. An overcasting switch is preferred.

Therefore, while this invention has been described with reference to a particular embodiment, it is to be understood that modifications may be made without departing from the spirit of the invention or from the scope of the following claims.

INDUSTRIAL APPLICABILITY

This invention relates to transportable liners for use in live wells, for fishing or the like.

What is claimed is:

1. A transportable liner for use in holding a catch within a live well having an aqueous solution therein, which comprises:
   (a) adjoining side and bottom portions of a substantially flexible, porous material having aperatures therethrough of a size less than the size of the catch, the side and bottom portions forming a liner enclosure having a top opening, the liner enclosure sized for use within the live well;
   (b) a draw string receiving means disposed about the upper portion of the liner sides;
   (c) a draw string disposed through the draw string receiving means and extending externally of the draw string receiving means on at least a portion of two opposing sides of the liner;
   (d) a plurality of releasable retaining means disposed about the upper portion of the liner sides for releasable securement of the liner to the live well on at least two sides;
   (e) a weighted cord secured in proximity to the bottom of the liner, the weighted cord of a weight sufficient to resist bouyancy of the liner within the live well in the presence of the aqueous fluid therein;
   wherein the liner is disposed and releasably secured within the live well, and the catch is disposed through the open top of the liner into the aqueous fluid in the live well for safekeeping, and the externally exposed portion of the drawstring may be pulled to draw the upper portions of the liner sides together to secure the catch within the liner for subsequent removal and transport of the catch from the live well.

2. A transportable liner for use in a live well having an aqueous solution therein, the liner having an open top portion, adjoining side portions and a bottom portion, the sides and bottom portion formed of a flexible, porous material, with a draw string slidably secured to at least two side portions in proximity to the open top portion, wherein the improvement comprises:
   (a) a releasable retaining means disposed about the side portion of the liner in proximity to the open top portion for releasable securement of the liner to the sides of the live well;
   (b) a weighted cord secured in proximity to the bottom of the liner, the weighted cord of a weight sufficient to resist bouyancy of the liner within the live well when in the presence of an aqueous fluid therein, wherein the draw string may be pulled to release the liner from the live well and draw the upper portion of the liner sides together for subsequent removal and transport of the liner from the live well.

3. A transportable liner for use in a live well having an aqueous fluid therein, which comprises:
(a) opposing, flexible porous side portions secured to a flexible, porous bottom portion in a manner to form a liner having an open top portion;
(b) a means to releasably secure the liner to the live well with the top portion in an open position;
(c) a weighted cord secured in proximity to the bottom of the liner, the weighted cord of a weight sufficient to resist bouyancy of the liner within the live well in the presence of an aqueous fluid therein; and
(d) a means to draw the side portions of the liner together to release the liner from the live well and to draw closed the open top portion for ease of transport of the liner from the live well.

4. The liner of claim 1, wherein the openings in the sides and bottom of the liner are less than one inch and greater than one thirty-second inch in size.

5. The liner of claim 1, wherein the porous material comprises a woven mesh construction.

6. The liner of claim 1, wherein the draw string retaining means comprises a plurality of loops sized to receive the draw string therethrough, said loops secured in spaced relation about the upper portions of at least two sides.

7. The liner of claim 1, wherein the draw string retaining means comprises an internal passage sized to receive the draw string therethrough, said internal passage formed at the upper portion of at least two sides by folding and securing at least a portion of the side material to itself to form the internal passage therebetween.

8. The liner of claim 1, wherein the releasable retaining means comprises a plurality of suction cups secured to the upper portion of the liner sides, for releasable securement of the suction cups to the live well sides.

9. The liner of claim 1, wherein the releasable retaining means comprises a hook and eye fastener means, one of said hook and eye fastener means secured to the upper portion of the liner on at least two sides, and the other of the hook and eye fastener means secured to at least two sides of the live well in alignment with the hook and eye fastener means secured to the liner, for releasable securement between said hook and eye fastener means.

10. The liner of claim 5, wherein the hook and eye fastener means portion secured to the live well is secured by gluing.

11. The liner of claim 1, wherein the releasable retaining means comprises a hook and eye fastener means and a suction cup means, one of said hook and eye fastener means secured to the upper portion of the liner on at least two sides, and the other of the hook and eye fastener means secured to the suction cup means, wherein the suction cup means is releasably secured to the live well on at least two sides, and the liner may be removed from the live well by releasing one of the hook and eye fastener means and the suction cup means.

12. The liner of claim 1, wherein the releasable retaining means comprises a plurality of magnets secured in spaced relation about the upper portion of the liner sides, with a plurality of aligned attracting magnets secured to the sides of the live well.

13. The liner of claim 1, wherein the releasable retaining means comprises a plurality of magnets secured in spaced relation about the upper portion of the liner sides, for securement to the ferris sides of a live well.

14. The liner of claim 1, wherein the means to resist bouyancy comprises forming the porous sides and bottom of a non-bouyant material of a rigidity sufficient to resist bouyancy of the liner within the live well in the presence of an aqueous fluid therein.

15. The liner of claim 3, wherein the porous ends, sides and bottom of the liner comprise a woven mesh construction having openings therein which are less than one inch and greater than one thirty-second inch in size.

16. The liner of claim 3, wherein the draw string retaining means comprises an internal passage sized to receive the draw string therethrough, said internal passage formed at the upper portion of the sides by folding and securing at least a portion of the side material to itself to form the internal passage therebetween.

17. The liner of claim 3, wherein the releasable retaining means comprises a plurality of suction cups secured to the upper portion of the liner sides, for releasable securement of the suction cups to the live well sides.

18. The liner of claim 3, wherein the releasable retaining means comprises a hook and eye fastener means, one of said hook and eye fastener means secured to the upper portion of the liner on at least two sides, and the other of the hook and eye fastener means secured to at least two sides of the live well in alignment with the hook and eye fastener means secured to the liner, for releasable securement between said hook and eye fastener means.

19. The liner of claim 3, wherein the means to resist bouyancy comprises a weighted portion secured in proximity to the bottom of the liner, of a weight sufficient to resist bouyancy of the liner within the live well in the presence of an aqueous fluid therein.

* * * * *